United States Patent
Eden

[11] Patent Number: 5,851,017
[45] Date of Patent: Dec. 22, 1998

[54] BICYCLE STORAGE FRAME

[76] Inventor: Tom Eden, 5116 Pine St., Omaha, Nebr. 68106

[21] Appl. No.: 742,804

[22] Filed: Nov. 1, 1996

[51] Int. Cl.$^6$ .................................................. B62K 19/40
[52] U.S. Cl. .................. 280/201; 280/281.1; 280/288.3; 280/288.4; 222/192; 222/394
[58] Field of Search ................................ 280/201, 288.1, 280/202, 288.3, 281.1, 288.4, 200; 222/192, 191, 394, 386.5, 397, 399, 400.7; 220/703, 705; 137/206, 209

[56] References Cited

U.S. PATENT DOCUMENTS

| | | | |
|---|---|---|---|
| 679,512 | 7/1901 | Rock | 280/201 |
| 1,205,382 | 11/1916 | Parda | 280/281.1 |
| 2,354,125 | 7/1944 | Johnston . | |
| 2,865,541 | 12/1958 | Hicks | 222/386.5 |
| 3,269,480 | 8/1966 | Kirby | 280/281.1 |
| 4,386,721 | 6/1983 | Shimano . | |
| 4,585,246 | 4/1986 | Diekman et al. | 280/281.1 |
| 4,815,635 | 3/1989 | Porter | 280/288.4 |
| 4,917,397 | 4/1990 | Chonan | 280/281.1 |
| 4,974,864 | 12/1990 | Giocastro | 280/288.3 |
| 5,054,571 | 10/1991 | Takasaka | 280/281.1 |
| 5,131,671 | 7/1992 | Wilhelms | 280/288.3 |
| 5,143,390 | 9/1992 | Goldsmith | 280/201 |
| 5,158,218 | 10/1992 | Wery | 280/288.4 |
| 5,158,733 | 10/1992 | Trimble | 280/281.1 |
| 5,248,159 | 9/1993 | Moore | 280/276 |
| 5,301,858 | 4/1994 | Hollander | 224/148 |
| 5,328,194 | 7/1994 | Buckler | 280/202 |
| 5,509,678 | 4/1996 | Ullman et al. | 280/281.1 |

FOREIGN PATENT DOCUMENTS

| | | | |
|---|---|---|---|
| 821405 | 12/1937 | France . | |
| 1287547 | 2/1962 | France . | |
| 482992 | 7/1953 | Italy | 280/201 |
| 2220989 | 9/1990 | Japan . | |
| WO 9412380 | 6/1994 | WIPO . | |

Primary Examiner—Anne Marie Boehler
Attorney, Agent, or Firm—Adam H. Jacobs

[57] ABSTRACT

A bicycle storage frame for storing fluids includes a hollow fluid-tight frame section having a wall structure and an internal fluid chamber and at least one liquid fill opening formed in the wall structure accessing the internal fluid chamber of the frame section. At least one gas fill valve extends through the wall structure to access the internal fluid chamber for inputting of pressurized gas into the frame section and at least one liquid release valve extends through the wall structure accessing the internal fluid chamber for release of liquid held within the frame section. At least one gas release valve extends through the wall structure accessing the internal fluid chamber for releasing pressurized gas from within the frame structure and a gas transfer device such as an air chuck is connected to the gas release valve externally of the frame section for transferring gas from within the internal fluid chamber to a tire for inflation thereof.

13 Claims, 4 Drawing Sheets

BICYCLE STORAGE FRAME

BACKGROUND OF THE INVENTION

1. Technical Field

This invention is directed to a bicycle storage frame and, more particularly, to a bicycle frame for storing fluids which includes at least one hollow, fluid-tight frame section for containing air and/or potable water, a liquid fill opening extending into the frame section for permitting inflow of liquids, a compressed air valve extending into the frame section for permitting inputting of compressed air, a liquid release tube and an air chuck for permitting use of the compressed air held within the bicycle storage frame.

2. Description of the Prior Art

From the time the bicycle was first invented, bicycle operators have encountered a multitude of problems in using bicycles. Some of these problems include the bicycle's stability, frame strength and other such mechanical impositions. With the advent of better technology, most if not all of these problems have been effectively solved. However, there remain several problems involved with bicycle operation which have not been addressed.

One particularly vexing problem encountered with the use of bicycles is the constant possibility of sustaining a flat tire in an area far removed from reinflation facilities. This problem has become even more prevalent with the recent rapid growth in mountain biking and distance biking, where the bicycle operator is traveling through remote locations. If the bicycle were to sustain a flat tire in such a remote location, the bicycle operator might have little choice but to ride a substantial distance on the rim of the tire, perhaps causing damage to the rim. At the very least, the bicycle operator is severely inconvenienced by the flat tire.

Some examples of attempts to deal with the above-described problem are found in the prior art. These include such devices as those described in Wilhelms, U.S. Pat. No. 5,131,671, which discloses a man's bicycle with an integrated air pump, specifically having one portion of the tubular frame of the bicycle constructed as an air pump portion with an air outlet in the front part of the air pump portion and in which there is an air piston on an air piston rod which ends in a pump handle disposed outside of the air pump portion. While this invention represents a novel attempt to solve the problem of reinflation of a flat tire, it also includes several disadvantageous features. For example, reinflation of the flat tire requires the operator of the bicycle to balance the bicycle while using the air pump on the bicycle which, depending on the size and weight of the bicycle, may present a somewhat difficult task. Furthermore, the air pressure requirements of the tube within the bicycle tire may be so great as to preclude inflation by standard air pump means. Therefore, although Wilhelms attempts to solve the problem of reinflation of a flat tire, it does not quite succeed in providing the best solution.

Various other devices have been proposed for solving the reinflation problem, but almost universally these inventions involve some sort of air pump, whether formed integrally with the bicycle or carried on the bicycle frame. Again, however, the problems related in connection with Wilhelms remain with those other solutions proposed in the prior art. The safest and most effective way to reinflate a flat tire is by use of a compressed air system, whether held in a tank or supplied by a compressor system. Of course, most if not all compressed air systems cannot be transported by a typical bicycle due to their size and weight. However, the fact still remains that the quickest and safest way to reinflate a bicycle tire is by use of compressed air. Therefore, there is a need for a portable compressed air dispenser for inflating bicycle tires in a location removed from other inflation means.

It is also important that any portable compressed air dispenser not interfere with operation of the bicycle, specifically by causing interference with pedaling, or even falling off the bicycle resulting in the bicycle running over the dispenser, possibly causing loss of control of the bicycle. Various types of bottle holders and straps have been proposed for securing items to the frame of a bicycle, but this can often result in the stability of the bicycle being affected due to the addition of a heavy object to the frame. There is therefore a need for a compressed air reinflation system which is formed integrally with the frame to prevent interference with the use of the bicycle.

Another need not addressed in the prior art is the need for efficient and effective warning devices which can be easily used on a bicycle. There are several types of horn systems available, but very few if any of these provide the decibel level necessary to warn oncoming traffic of the presence of the bicycle. There is therefore a need for an air horn which will warn traffic of the presence of the bicycle.

Another problem encountered in the use of bicycles is that the operator of the bicycle must occasionally consume water or another liquid to replenish that lost through perspiration. Commonly, a bicycle operator will bring a water bottle or the like with him or her on the bike ride to provide necessary liquids during the ride. Of course, the water bottle must be secured on the frame when it is not in use, requiring a cage support or the like for performing this function. As was discussed previously, addition of bottle holders to the frame can result in unbalancing of the bicycle and/or inconveniencing of the operator due to the location of the water bottle on the frame. This can interfere with the use of the bicycle. Numerous examples are found in the prior art of attempts to address this problem, including Johnston, U.S. Pat. No. 2,354,125, Shimano, U.S. Pat. No. 4,386,721, and Hollander, U.S. Pat. No. 5,301,858, each of which disclose a variation on a frame-mounted water bottle. Each of these inventions, however, includes the disadvantage of being affixed to the frame of the bicycle thus potentially interfering with the operation of the bicycle by the operator. There is therefore a need for a liquid storage reservoir for a bicycle which will not interfere with the operation of the bicycle nor require the addition of mounting brackets or the like to the frame.

It is also desirable that any such water dispensing system on the bicycle be capable of dispensing water to the rider while the bike is being ridden and not require stopping the bicycle in order to obtain liquid therefrom. To this end, it may be desirable to provide a slightly pressurized water container for dispensing water from a tube or like without requiring the operator of the bicycle to remove the liquid from the container by suction. In addition to preserving the bicycle operator's "wind", the safety of the bicycle operator is ensured due to the ease with which liquid may be obtained from the dispensing unit. Furthermore, it is important that the bicycle operator keep both hands on the handlebars at all times for safety reasons. Therefore, there is a need for a liquid dispenser which will dispense slightly pressurized liquid therefrom in order to facilitate drinking of the liquid by the bicycle operator, preferably without the operator removing his or her hands from the handlebars. At present, no example is found in the prior art which satisfies this requirement.

Therefore, an object of the present invention is to provide an improved bicycle storage frame.

Another object of the present invention is to provide a bicycle storage frame which includes at least one hollow fluid-tight frame or frame section having a wall structure and an internal fluid chamber through which at least one liquid fill opening extends for inserting liquids into the frame section, a gas fill valve extending into the frame section for insertion of pressurized gas there within, a liquid release tube for dispensing liquid from the frame section and an air chuck or the like for extending from the frame section for connection to the fill valve of a tire for reinflation thereof.

Another object of the present invention is to provide a bicycle storage frame which is lined with a polymer substance or plastic liner for separating the contents of the frame section from the metal or composite frame structure material, thereby preventing contamination of potable water held within the frame section.

Another object of the present invention is to provide a bicycle storage frame which contains pressurized liquids which may be quickly and easily dispensed from a liquid supply tube so that a bicycle operator may drink from the fluid stored within the frame without having to stop motion of the bike.

Another object of the present invention is to provide a bicycle storage frame which may contain compressed air for quickly and easily reinflating a flat tire regardless of the location where the flat repair is taking place.

Another object of the present invention is to provide a compressed air operated air horn mounted on the bicycle for warning traffic of the presence of the bicycle by a high-decibel noise being emitted from the air horn, compressed air for which is supplied from the internal fluid chamber.

Finally, an object of the present invention is to provide a bicycle storage which is relatively simple to manufacture and is safe and efficient in use.

SUMMARY OF THE INVENTION

The present invention provides a bicycle storage frame for storing fluids which includes a hollow, fluid-tight frame section having a wall structure and an internal fluid chamber and at least one liquid fill opening extending through the wall structure to permit access to the internal fluid chamber of the frame section. At least one gas fill valve extends through the wall structure accessing the internal fluid chamber of the frame section for permitting inflow of pressurized gas into the frame section. At least one liquid release valve extends through the wall structure accessing the internal fluid chamber of the frame section for release of liquid held within the frame section and at least one gas release valve extends through the wall structure accessing the internal fluid chamber of the frame section for controlled release of pressurized gas from within the frame section. Connected to the gas release valve is an air chuck or the like for connection to the inflation valve of a bicycle tire for reinflating a tire with the pressurized gas held within the internal fluid chamber. The internal fluid chamber within the frame section may also be lined with a polymer substance or plastic lining to prevent contamination of potable fluids held within the internal fluid chamber.

The present invention provides a substantial improvement over those devices found in the prior art for several reasons. For example, because the frame section now holds within it a quantity of pressurized gas, reinflation of a flat tire is quickly and easily done by connection of a gas transfer device such as an air chuck to the gas release valve and likewise to the tire inflation valve. Also, because of the presence of the pressurized gas in connection with the potable water held within the frame section, release of liquid through the liquid release valve is easily accomplished without requiring application of suction to the dispensing tube. Most importantly, however, because the container for the pressurized gas and liquid is formed as an integral part of the bicycle frame, previously unused space within the frame is now efficiently used and further, no additional structural features need be added to the frame, thus retaining the performance characteristics of the original bicycle. It is thus seen that the present invention provides a substantial improvement over those inventions found in the prior art.

DESCRIPTION OF THE PREFERRED EMBODIMENT

Figure 1:
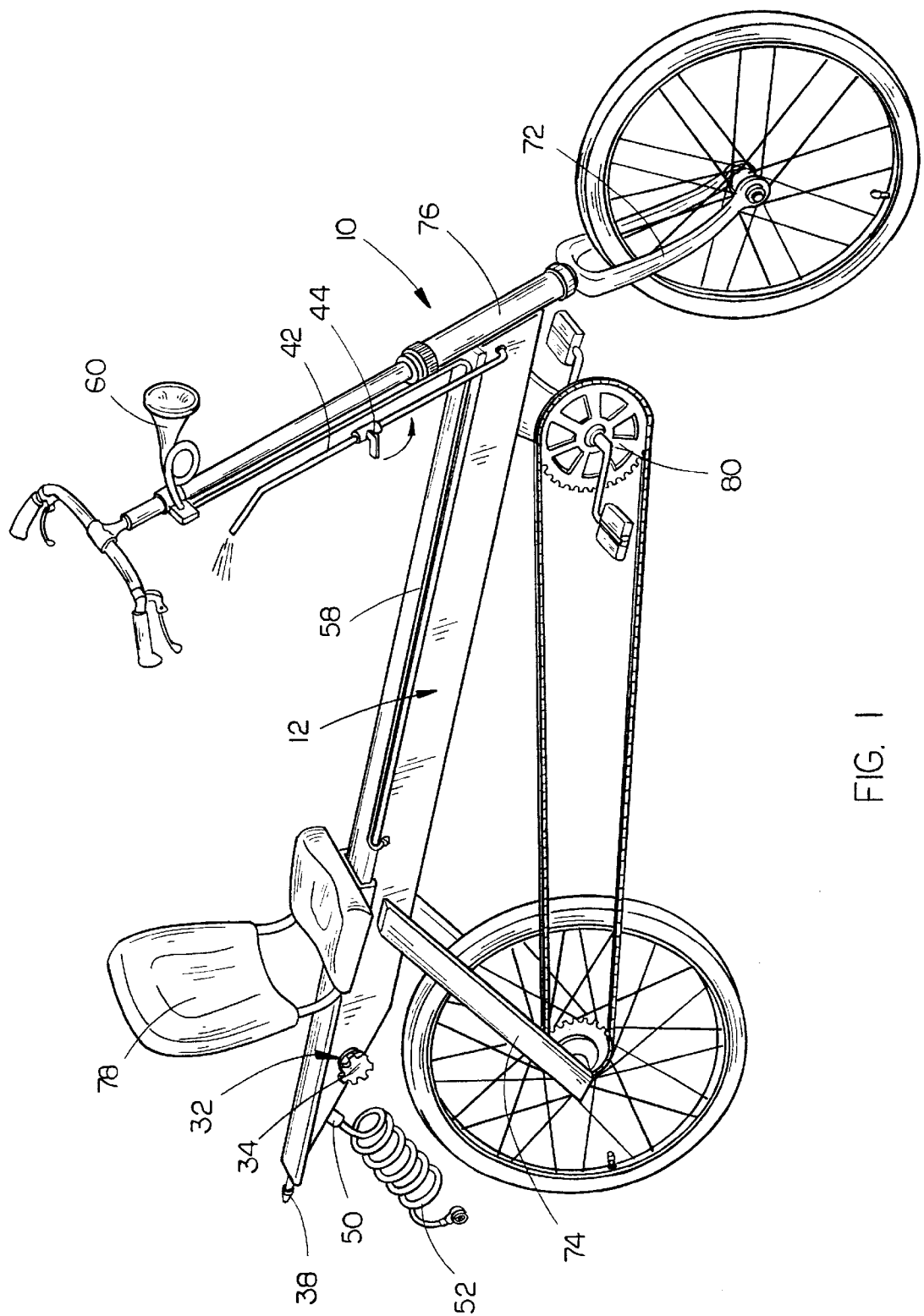
FIG. 1 is a perspective view of the recumbent bicycle of the present invention displaying the air chuck and water dispensing tube.

The bicycle storage frame 10 of the present invention is best shown in FIGS. 1–4 as part of a recumbent-type bicycle 70 which includes a main frame unit 12, a front wheel and wheel strut assembly 72, a rear wheel and rear strut assembly 74, steering mechanism 76, a bicycle seat 78 and a gearing system 80. Of course, it is to be understood that the bicycle storage frame 10 of the present unit may be used on any type of bicycle be it recumbent or otherwise.

The main frame unit 12 is best shown in FIGS. 1–5 as including a rectangular U-shaped channel 14 on top of which is mounted a flat metal strip 16 thus forming the main frame unit 12 which is generally T-shaped in cross-section. In the preferred embodiment, the main frame unit 12 dimensions would be approximately 60" to 72" in length, 3" to 6" in height, 1" to 3" in width across the U-shaped channel and 2" to 4" in width across the flat metal strip 16. The size and shape of the frame are not critical to the invention, however.

The forward end of the main frame unit 12 is closed off by the steering mechanism 76, and the rearward end of the main frame unit 12 is closed off by any appropriate means such as a rear plate 17 or the like. In the preferred embodiment, the main frame unit's wall structure (consisting of the U-shaped channel 14, the metal strip 16 and the closed-off ends, including rear plate 17) is fluid-tight, both to prevent external contaminants from entering the interior volume of the main frame unit 12 and to form a fluid-tight fluid chamber 18, shown best in FIG. 2.

The fluid chamber 18 preferably extends the entire length of the main frame unit 12, and referring to the dimensions shown above (60" in length, 4" in height and 2" in width), the fluid chamber would have a volume of approximately 480 cubic inches, which equals 7.93 liters or 2.09 gallons of fluid. It is not necessary that the fluid chamber 18 extend the length of the frame 12, and in fact the frame 12 may be partitioned in any desired manner.

The fluid chamber 18 of the bicycle storage frame 10 is adapted to store both gases and liquids, and is specifically designed to store compressed or pressurized air and potable or drinking water. Obviously, due to the fluid-tight nature of the fluid chamber 18, input and output valves and/or openings must be formed in the wall structure of the fluid chamber 18.

Figure 3:
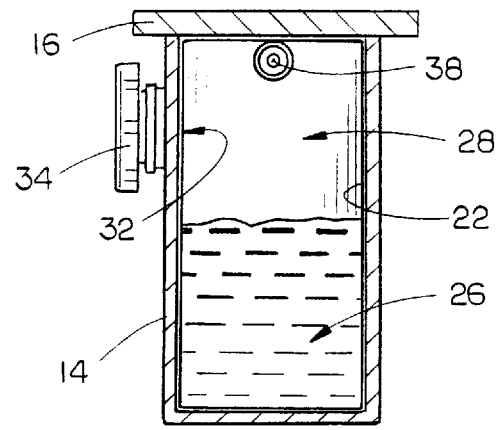
FIG. 3 is a front sectional view of the frame showing the polymer lining within the frame.

To that end, a water fill opening 32 is formed extending through one of the upright walls of U-shaped channel 14, as shown in FIGS. 1 and 3. It is preferred that the water fill opening 32 be located towards the rear of the frame 12 as the frame is angled downwards. This will prevent water from exiting from the fluid chamber through the water fill opening 32 when water is being poured into the fluid chamber. The water fill opening 32 would preferably have a diameter of between 1" and 3" and further include a water fill opening cap 34 to close water fill opening 32 once the filling process is completed. Of course, the water fill opening cap 34 must form a fluid-tight seal over water fill opening 32 and further must be capable of withstanding fluid pressure applied from within the fluid chamber 18 by fluids retained therein. Therefore, water fill opening cap 34 may be constructed of aluminum or another such metal which will not deform under pressure.

Figure 2:
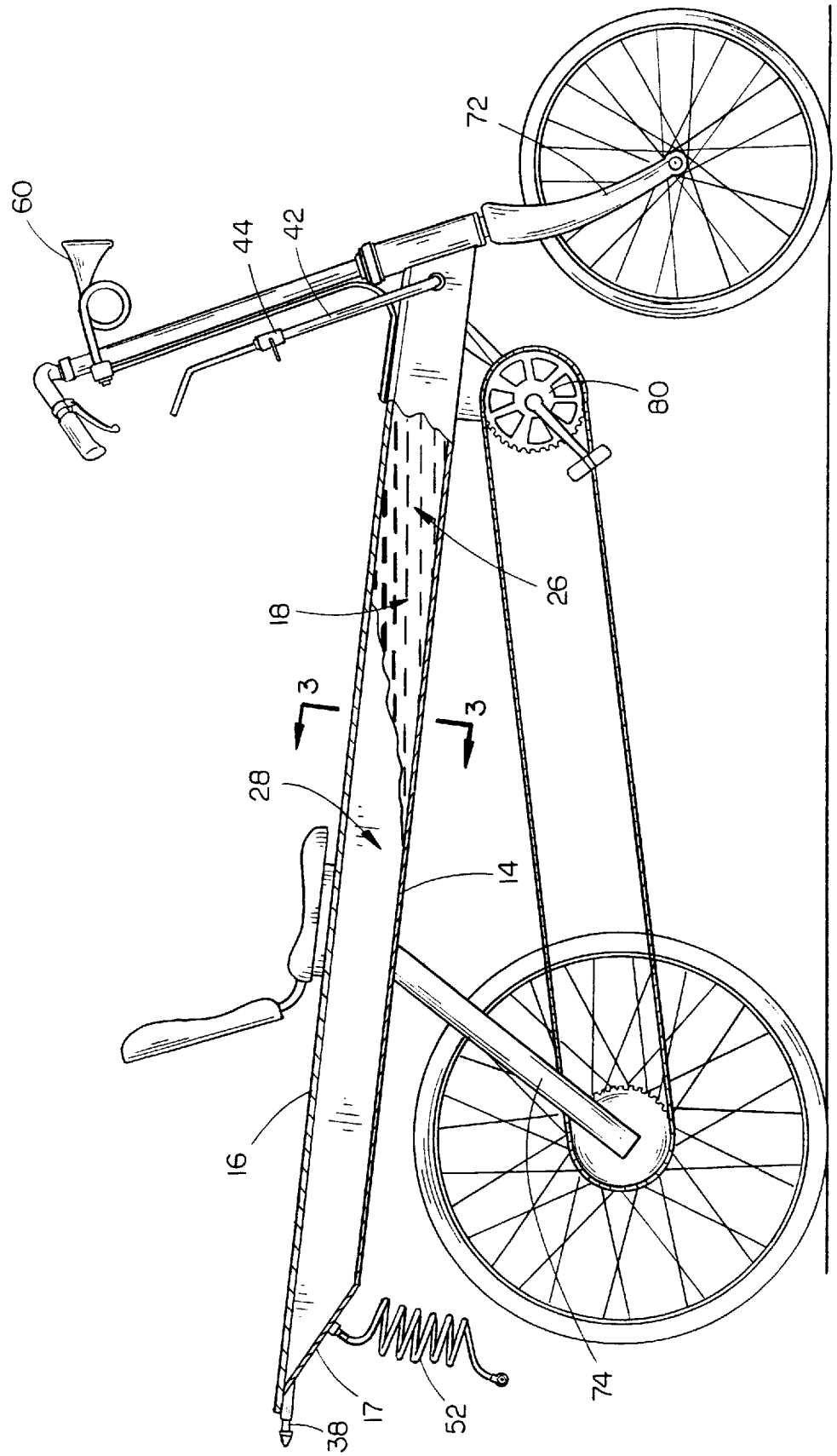
FIG. 2 is a side sectional elevational view of the frame showing how the compressed air and potable water are held within the frame section.
Figure 4:
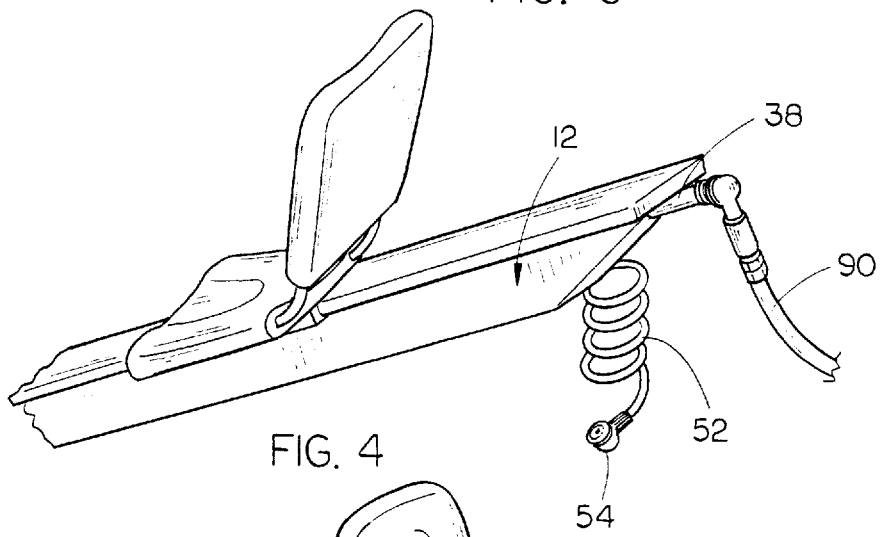
FIG. 4 is a partial perspective view of the rear of the bike frame showing an air fill hose extending from a compressor unit, the air fill hose connected to the gas fill valve for inputting pressurized air into the frame.

For inputting of pressurized gas into the fluid chamber 18, an air input valve 38 is mounted adjacent the rear end of the frame 12, preferably in rear wall 17 as shown in FIG. 2. Air input valve 38 is preferably a standard metal one-way stem ball valve extending through rear wall 17 into fluid chamber 18. The air input valve 38 allows compressed air from a compressor unit to be put into the fluid chamber without requiring opening of the fluid chamber 18. FIG. 4 shows compressed air being put in to the fluid chamber 18 through the air input valve 38 by connection of an air compressor hose 90 to the air input valve 38. It is expected that the frame 12 and fluid chamber 18 will be capable of storing a volume of air at up to 100 psi, should such an air pressure be required.

FIGS. 2 and 3 show that the fluid chamber 18 is designed to simultaneously hold both water 26 and air 28, with the water 26 collecting in the forward/lower portion of the fluid chamber 18 and the air 28 collecting in the rearward/upper portion of the fluid chamber 18. Of course, it is not necessary that the fluid chamber 18 be filled with specific amounts of either water 26 or air 28, but it is important to note that if the fluid chamber is completely filled with water, the weight added to the frame 12 will be approximately seventeen (17) pounds, which may render the bicycle unstable. It has been found that lesser amounts of water may be stored in the fluid chamber 18 which will still provide the desired amount of drinking water for the bicycle operator while not affecting stability of the bicycle.

It may be important to provide a fluid chamber liner 22 as shown in FIG. 3 to line the interior of the wall structure of the fluid chamber 18 in order to prevent contamination of the fluid held within the fluid chamber 18. Specifically, the water 26 in the chamber 18 must be kept free of contaminants or the entire purpose of the invention is destroyed. In the preferred embodiment, the liner 22 would be an inert polymer coating applied directly to the walls of the fluid chamber 18 which would separate the water 26 and air 28 from the walls of the fluid chamber 18. The polymer coating will be of any acceptable, commercially available type and the method by which the coating is applied is well-known in the art of polymer application. Of course, it is to be understood that the liner 22 may also be constructed of plastic or any other non-reactive lining substance so long as the separation of the water 26 and air 28 from the walls of the fluid chamber 18 is achieved. The chamber liner 22 becomes even more important when the frame construction material is something other than metal, such as graphite composite or fiberglass, which, if ingested, might cause internal damage to the consumer of the fluids.

For releasing water from the fluid chamber 18, a water outflow tube 42 and water outflow valve 44 are provided mounted on the frame 12, with the water outflow tube 42 extending through the wall of the fluid chamber 18 adjacent the forward end of the main frame unit 12 and the water outflow valve 44 mounted on the water outflow tube 42 to control and regulate fluid flow through the tube 42. In order to access almost all water held within the fluid chamber 18, it is preferred that the end of the water outflow tube 42 within the fluid chamber 18 be seated at the lowest point of the fluid chamber 18. As the fluid chamber 18 includes a quantity of pressurized gas, the water 26 within the fluid chamber will be forced out through water outflow tube 42 when water outflow valve 44 is opened. Of course, there may be up to 100 psi forcing the water 26 through the tube 42, which could make for a very unpleasant drinking experience. For this reason, it is preferred that the water outflow valve 44 be a pressure regulator-type valve which will release water 26 only at approximately 10 psi, which should provide sufficient force to provide water to the bicycle operator.

Although the water outflow tube 42 is shown in FIGS. 1 and 2 as extending upwards to below the handlebars of the bicycle, in the preferred embodiment the water outflow tube would extend upwards to the handlebars with the water outflow valve 44 positioned on the handlebars themselves. In this manner, the operator of the bicycle can easily operate the water outflow valve 44 without requiring the removal of a hand from the handlebars, thus increasing the safety of the operator. The water outflow tube 42 which extends from the valve 44 would preferably be a neoprene tube or the like which would extend to the rear of the seat 78 along frame 12 and then up over the seat for attachment to the lapel of the operator's shirt thus allowing the operator of the bicycle to drink without changing position on the bicycle. The purpose for showing the water outflow tube 42 and water outflow valve 44 as they are shown in FIGS. 1, 2 and 6, is for clarification purposes and because the exact positioning and design of the water outflow tube 42 and water outflow valve 44 is not critical to the invention.

Figure 5:
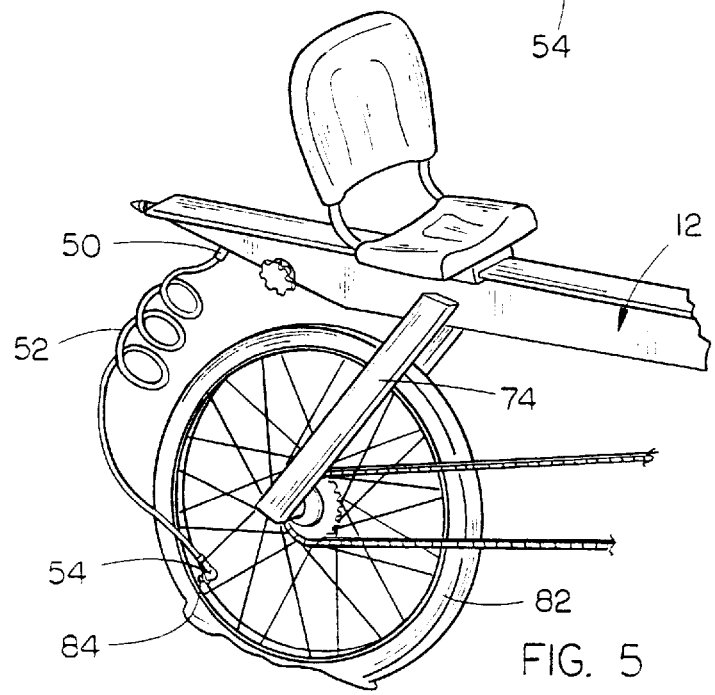
FIG. 5 is a perspective view of a bike when a tire is being filled from the air chuck mounted on the bike.

For releasing compressed air from the fluid chamber 18, an air output valve 50 is provided extending through the rear wall 17 of the main frame unit 12 into the fluid chamber 18, as shown best in FIGS. 2, 4 and 5. The air output valve 50 is preferably a metal tube extending through the rear wall 17, the tube having a ridged connection section external of the fluid chamber 18 for connection of an air hose 52 thereto. The air hose 52 extends outwards from air output valve 50 and is preferably constructed of a neoprene or rubber hose. Mounted at the outer end of air hose 52 is a standard air chuck 54 for connection to the stem valve of a bicycle tire. While the exact dimensions of the air hose 52 are not critical, it is preferred that the air hose 52 be able to reach the front wheel 72 for reinflation thereof if necessary.

FIG. 5 shows the reinflation of the rear tire 82 following a flat. First, of course, the bicycle operator would patch the flat with any appropriate patching device. The air chuck 54 would then be affixed to the stem valve 84 of the tire 82, and when the air chuck 54 is pressed onto the stem valve 84 compressed air is released from the fluid chamber 18, and travels through air output valve 50, air hose 52 and air chuck 54 and into the tire 82 through the stem valve 84 thus reinflating the tire 82. It is expected that the fluid chamber 18 will hold sufficient air for reinflation of at least two tires and possibly even more.

Figure 6:
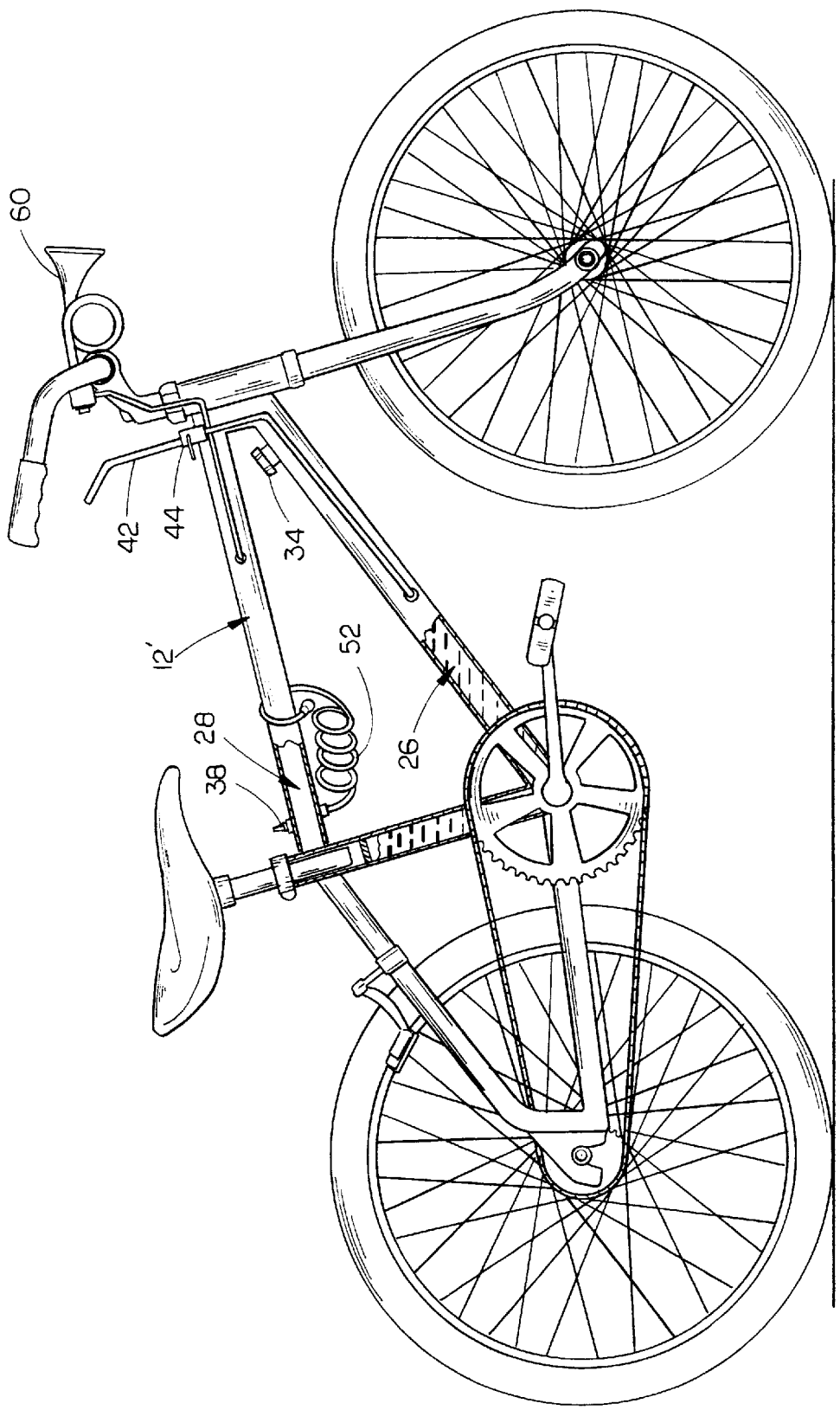
FIG. 6 is a sectional perspective view of a standard "diamond frame" bicycle outfitted in the same manner as the recumbent bike shown in FIG. 1.

Finally, one of the safety features of the present invention is the use of the air horn 60 which may be mounted on the bike in any desired location, but is shown in FIGS. 1 and 6 on the handlebars of the bicycle. By connecting the air horn 60 to the fluid chamber 18 by an air horn hose 58, the air horn may be powered by the compressed air held within the fluid chamber 18. It is well known that compressed air powered horns are substantially louder than other types of bicycle horns, and as the present invention provides a ready source of compressed air, it is sensible to include such an air horn 60 on the present invention.

FIG. 6 shows a different frame design bicycle which has been outfitted according to the teachings of the present invention. The main frame unit 12' includes all of the features described in connection with main frame unit 12, but applied to a standard diamond frame bicycle. As shown, the water 26 would gather in the lower "V" section of the frame 12' whereas the air would reside in the upper section of the frame 12'. Of course, the frame 12' could include partitions and the like, just as those may be included in the originally described frame 12.

It is to be understood that numerous modifications, substitutions and additions may be made to the present invention which fall within the intended broad scope of the appended claims. For example, the bicycle storage frame 10 may be used on any type of bicycle, as shown in FIG. 6, although it is perhaps best suited for use on a semi-recumbent or recumbent bicycle. Likewise, the lining substance may be of any appropriate kind, so long as the intended purpose of separating the fluids contained within the fluid chamber 18 from the main frame unit 12 and specifically to prevent the contamination of fluids held within the fluid chamber 18. The arrangement and dimensions of the invention as described above also may be varied, so long as the basic functionality of the invention remains intact.

There has thus been shown and described a bicycle storage frame which accomplishes at least all of the stated objectives.

I claim:

1. A bicycle storage frame for storing fluids comprising:
    at least one hollow, fluid-tight frame section having an enclosing wall structure forming an internal fluid chamber;
    at least one liquid fill opening formed in said wall structure accessing said internal fluid chamber;
    at least one gas fill valve extending through said wall structure accessing said internal fluid chamber;
    at least one liquid release valve extending through said wall structure accessing said internal fluid chamber;
    at least one gas release valve extending through said wall structure accessing said internal fluid chamber; and
    gas transfer means connected to said gas release valve externally of said wall structure for transferring gas from within said frame section to an item to be inflated.

2. The bicycle storage frame of claim 1 wherein said frame section comprises a main frame unit including a generally rectangular U-shaped channel section having an open top, a flat metal strip closing said open top and end closing means such that said wall structure of said fluid-tight internal fluid chamber is formed by said U-shaped channel, said flat metal strip and said end closing means.

3. The bicycle storage frame of claim 1 wherein said liquid fill opening comprises a water fill opening extending through said wall structure of said internal fluid chamber and a water fill opening cap for closing said water fill opening with a fluid-tight seal to prevent fluid outflow when said cap is sealing said opening.

4. The bicycle storage frame of claim 1 wherein said gas fill valve comprises an air fill valve having a single directional flow ball valve construction to permit airflow through said air fill valve into said internal fluid chamber and restrict airflow outwards from said internal fluid chamber.

5. The bicycle storage frame of claim 1 wherein said liquid release valve comprises a water outflow tube and a water outflow valve operatively mounted on said water outflow tube to regulate liquid flow through said water outflow tube for controlled release of liquids held within said internal fluid chamber.

6. The bicycle storage frame of claim 5 wherein said water outflow valve further comprises a pressure regulator for reducing the pressure of the liquid passing therethrough to facilitate drinking of the liquids stored within said internal fluid chamber by an operator of the bicycle.

7. The bicycle storage frame of claim 6 wherein said water outflow tube comprises a flexible tube for facilitating drinking of liquids stored within said internal fluid chamber by an operator of the bicycle.

8. The bicycle storage frame of claim 1 wherein said gas release valve comprises an air output valve including a metal tube extending through said wall structure of said internal fluid chamber, said metal tube including a connection section external of said wall structure having a plurality of ridges to facilitate connection of an air hose thereto.

9. The bicycle storage frame of claim 8 wherein said gas transfer means comprises an air hose and air chuck, said air chuck mounted on one end of said air hose, said air chuck being adapted to connect with and transfer gas to a stem valve type of valve, the other end of said air hose mounted on said connection section of said air output valve in gas transfer connection therewith such that pressurized gas held within said internal fluid chamber can pass through said air output valve, through said air hose and through said air chuck into a stem valve for inflation of a tire or the like.

10. The bicycle storage frame of claim 1 further comprising a fluid chamber liner within said internal fluid chamber, said fluid chamber liner affixed to said wall structure of said internal fluid chamber, said fluid chamber liner separating fluids held within said internal fluid chamber from said wall structure of said internal fluid chamber whereby contamination of fluids is prevented.

11. The bicycle storage frame of claim 10 wherein said fluid chamber liner comprises an inert polymer coating applied to interior surfaces of said wall structure of said internal fluid chamber.

12. The bicycle storage frame of claim 1 further comprising an air horn mounted on said frame in gas transfer connection with said internal fluid chamber whereby said air horn is activated to produce horn sounds therefrom by transfer of pressurized gas from within said internal fluid chamber to and through said air horn, thereby increasing the safety of an operator of the bicycle.

13. A bicycle storage frame for storing fluids comprising:

at least one hollow, fluid-tight frame section having an enclosing wall structure forming an internal fluid chamber;

at least one liquid fill opening formed in said wall structure accessing said internal fluid chamber;

at least one gas fill valve extending through said wall structure accessing said internal fluid chamber;

at least one liquid release valve extending through said wall structure accessing said internal fluid chamber;

at least one gas release valve extending through said wall structure accessing said internal fluid chamber;

gas transfer means connected to said gas release valve externally of said wall structure for transferring gas from within said frame section to an item to be inflated; and a fluid chamber liner within said internal fluid chamber, said fluid chamber liner affixed to said wall structure of said internal fluid chamber, said fluid chamber liner separating fluids held within said internal fluid chamber from said wall structure of said internal fluid chamber whereby contamination of fluids is prevented.

* * * * *